United States Patent
He et al.

(10) Patent No.: US 10,393,032 B2
(45) Date of Patent: Aug. 27, 2019

(54) ELEVATED COMPRESSION RATIO INTERNAL COMBUSTION ENGINE WITH MULTI-STAGE BOOSTING

(71) Applicant: GM Global Technology Operations LLC, Detroit, MI (US)

(72) Inventors: Yongsheng He, Sterling Heights, MI (US); David J. Cleary, Shanghai (CN); Paul M. Najt, Bloomfield Hills, MI (US); Jim Liu, Pudong (CN); David Sun, Pudong (CN); Bin Zhu, Pudong (CN)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 15/558,024

(22) PCT Filed: Mar. 13, 2015

(86) PCT No.: PCT/CN2015/074198
§ 371 (c)(1),
(2) Date: Sep. 13, 2017

(87) PCT Pub. No.: WO2016/145570
PCT Pub. Date: Sep. 22, 2016

(65) Prior Publication Data
US 2018/0058343 A1 Mar. 1, 2018

(51) Int. Cl.
*F02D 13/02* (2006.01)
*F01L 1/08* (2006.01)
(Continued)

(52) U.S. Cl.
CPC ............ *F02D 13/0226* (2013.01); *F01L 1/08* (2013.01); *F01L 1/185* (2013.01); *F01L 1/20* (2013.01);
(Continued)

(58) Field of Classification Search
CPC .......... Y02T 10/144; Y02T 10/18; F01L 1/08; F02B 37/004; F02B 37/013;
(Continued)

(56) References Cited

U.S. PATENT DOCUMENTS

| | | | |
|---|---|---|---|
| 5,178,105 A | 1/1993 | Norris | |
| 6,276,334 B1 * | 8/2001 | Flynn | F02B 19/14 123/435 |

(Continued)

FOREIGN PATENT DOCUMENTS

| | | |
|---|---|---|
| CN | 102770646 A | 12/2009 |
| JP | 20100255525 A | 4/2009 |
| WO | 9936677 A1 | 7/1999 |

OTHER PUBLICATIONS

International Search Report on International Application No. PCT/CN2015/074198, dated Dec. 18, 2015.

*Primary Examiner* — Laert Dounis
(74) *Attorney, Agent, or Firm* — Quinn IP Law

(57) ABSTRACT

An internal combustion engine includes a cylinder block that defines a cylinder and a cylinder head mounted to the cylinder block. A reciprocating piston is arranged inside the cylinder for compressing an air and fuel mixture at a geometric compression ratio of at least 10:1. A crankshaft is arranged in the cylinder block and rotated by the piston. An intake valve is operatively connected to the cylinder head and controls delivery of air to the cylinder for combustion therein. A mechanism provides a constant peak lift of the intake valve over an angle of rotation of the crankshaft that is at least 5 degrees, i.e., an extended dwell at peak lift. A multi-stage boosting system having first and second gas compressors is selectively controlled to pressurize air that is received from the ambient for delivery to the cylinder. A vehicle having such an engine is also disclosed.

12 Claims, 6 Drawing Sheets

(51) Int. Cl.
<br>    *F02D 23/02*     (2006.01)
<br>    *F02B 37/04*     (2006.01)
<br>    *F01L 1/18*     (2006.01)
<br>    *F01L 9/04*     (2006.01)
<br>    *F01L 13/00*     (2006.01)
<br>    *F01L 1/20*     (2006.01)

(52) U.S. Cl.
<br>    CPC .............. *F01L 9/04* (2013.01); *F01L 13/0063* (2013.01); *F02B 37/04* (2013.01); *F02D 13/02* (2013.01); *F02D 23/02* (2013.01); *F01L 1/18* (2013.01); *F01L 2105/00* (2013.01); *Y02T 10/144* (2013.01); *Y02T 10/18* (2013.01)

(58) Field of Classification Search
<br>    CPC .............. F02D 13/0207; F02D 13/0211; F02D 13/0226; F02D 13/023; F02D 13/0246
<br>    See application file for complete search history.

(56) References Cited

U.S. PATENT DOCUMENTS

| | | | |
|---|---|---|---|
| 2003/0159441 A1* | 8/2003 | Kim | F01L 1/00 60/608 |
| 2004/0237917 A1* | 12/2004 | Yasui | F01L 1/022 123/90.15 |
| 2009/0314082 A1* | 12/2009 | Sujan | F01D 17/06 73/497 |
| 2011/0180035 A1 | 7/2011 | Durrett | |
| 2017/0226940 A1* | 8/2017 | Sun | F01L 1/08 |

\* cited by examiner

ELEVATED COMPRESSION RATIO INTERNAL COMBUSTION ENGINE WITH MULTI-STAGE BOOSTING

TECHNICAL FIELD

The present disclosure relates to an internal combustion engine having an elevated compression ratio and a multi-stage boosting system.

BACKGROUND

Internal combustion engines (ICE's) are often called upon to generate considerable levels of power for prolonged periods of time. Many such engines employ a boosting device, such as an exhaust gas turbine driven turbocharger or a mechanically-driven supercharger, to compress the airflow before it enters the intake manifold of the ICE in order to boost the engine's power and efficiency.

Considered broadly, both turbochargers and superchargers function as gas compressors that force more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, thereby increasing combustion pressures and generating more power.

In an effort to increase overall engine efficiency and response, some ICE's employ multi-stage boosting systems. Such boosting systems may include turbocharging systems with a smaller turbocharger that is more effective at lower exhaust flows and a larger turbocharger that is more effective at higher exhaust flows or a combined system having a mechanically- or electrically-driven supercharger and an exhaust-driven turbocharger. A transition between two turbochargers or supercharger and turbocharger in such boosting systems is typically controlled based on the particular engine's configuration and operating requirements.

SUMMARY

One embodiment of the disclosure is directed to an internal combustion engine that includes a cylinder block. The cylinder block defines a cylinder and a cylinder head mounted to the cylinder block. A reciprocating piston is arranged inside the cylinder and configured to compress an air and fuel mixture at a geometric compression ratio of at least 10:1. A crankshaft is arranged in the cylinder block and rotated by an application of combustion force on the piston. An intake valve is operatively connected to the cylinder head and configured to control delivery of the air to the cylinder for combustion therein. An exhaust valve is operatively connected to the cylinder head and configured to control removal of post-combustion gas from the cylinder. A mechanism provides a constant peak lift of the intake valve over an angle of rotation of the crankshaft that is at least 5 crank angle degrees, i.e., an extended dwell at peak lift. A multi-stage boosting system having a first gas compressor and a second gas compressor is selectively controlled to pressurize air that is received from the ambient for delivery to the cylinder.

The first gas compressor may be configured as a low-flow or high-pressure turbocharger driven by the post-combustion gas, and the second gas compressor may be configured as a high-flow or low-pressure turbocharger driven by the post-combustion gas.

Alternatively, the first gas compressor may be configured as a mechanically- or electrically-driven supercharger, while the second gas compressor may be configured as a high-flow turbocharger driven by the post-combustion gas.

The mechanism may generate the constant peak lift of the intake valve in the range of 5-80 degrees of the angle of rotation of the crankshaft and may delay closing of the intake valve into the compression cycle of the engine.

The engine may be a spark-ignition internal combustion engine with the geometric compression ratio in the range of 11-16:1.

The mechanism may include an electro-hydraulic actuator configured to generate the constant peak lift of the intake valve.

The mechanism may include an intake camshaft having a cam lobe for opening and closing of the intake valve relative to a position of the crankshaft.

The cam lobe may include a profile configured to generate the constant peak lift of the intake valve.

The mechanism may additionally include a variable-ratio cam follower or rocker arm arranged between the cam lobe and the intake valve, such that the cam follower is configured to generate the constant peak lift of the intake valve.

Another embodiment of the present disclosure is directed to a vehicle having such an internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
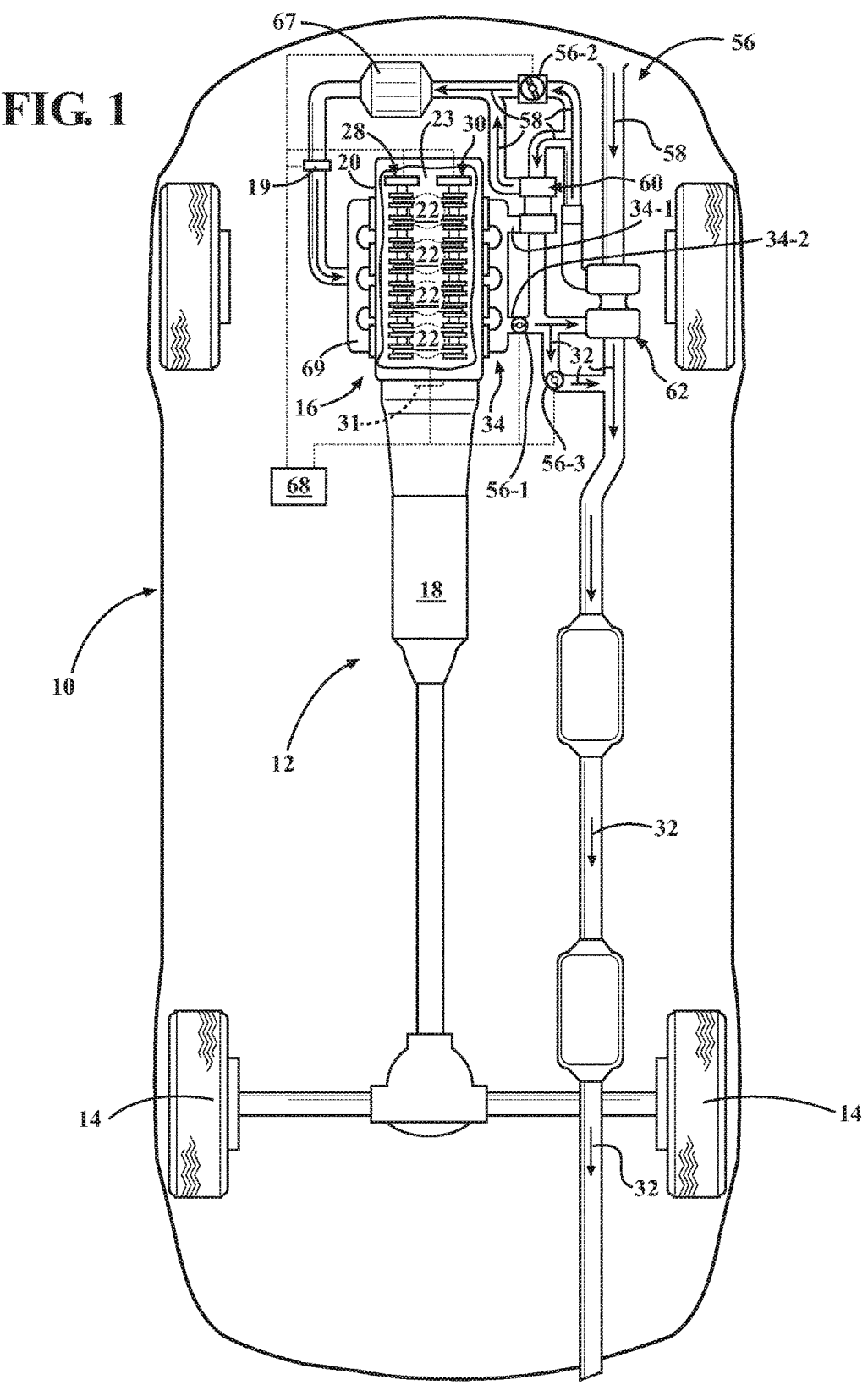
FIG. 1 is a schematic depiction of a vehicle having an engine with an embodiment of a multi-stage boosting system according to the disclosure.
Figure 2:
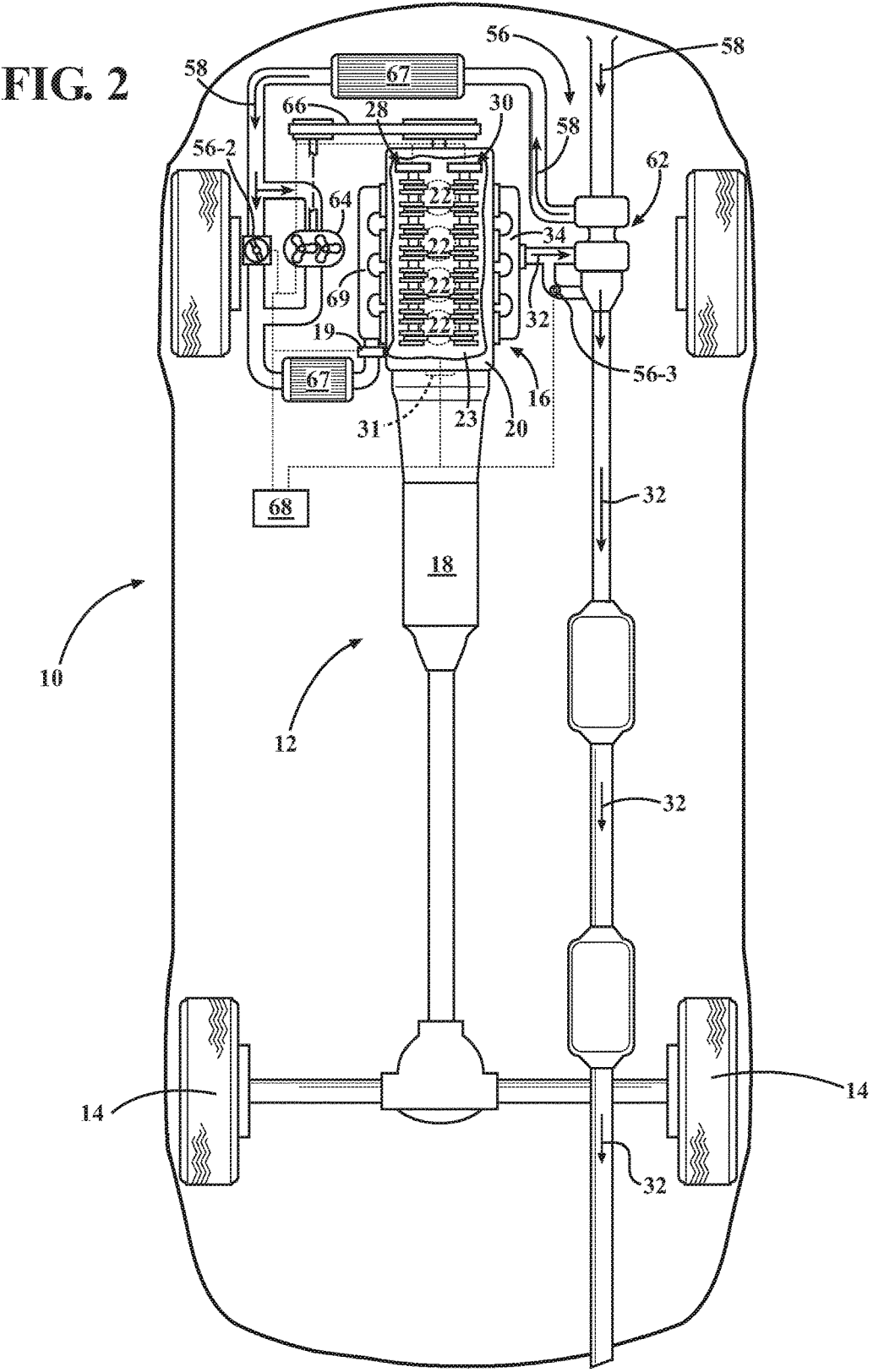
FIG. 2 is a schematic depiction of a vehicle having an engine with another embodiment of the multi-stage boosting system according to the disclosure.

Referring to the drawings, wherein like reference numbers correspond to like or similar components throughout the several figures, FIGS. 1-2 illustrate a vehicle 10 employing a powertrain 12 for propulsion thereof via driven wheels 14. As shown, the powertrain 12 includes an internal combustion engine 16 and a transmission assembly 18 operatively connected thereto. The powertrain 12 may also include one or more electric motor/generators, none of which are shown, but the existence of which may be envisioned by those skilled in the art. As shown, the engine 16 includes a cylinder block 20 with a plurality of cylinders 22 arranged therein and a cylinder head 23 that is mounted on the cylinder block. The cylinder head 23 may also be integrated into or cast together with the cylinder block 20.

Figure 3:
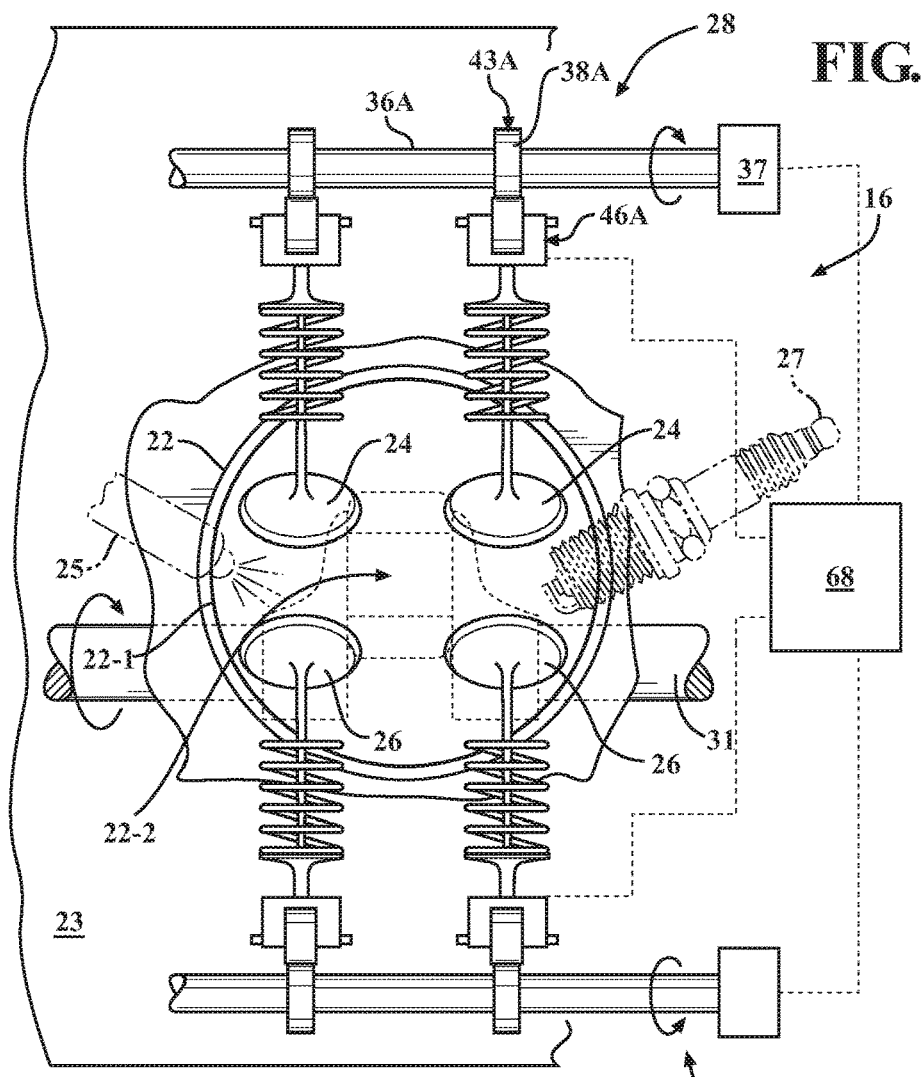
FIG. 3 is a schematic partial illustration of the engine having an embodiment of a mechanism configured to provide extended dwell at peak lift of the intake valves.
Figure 5:
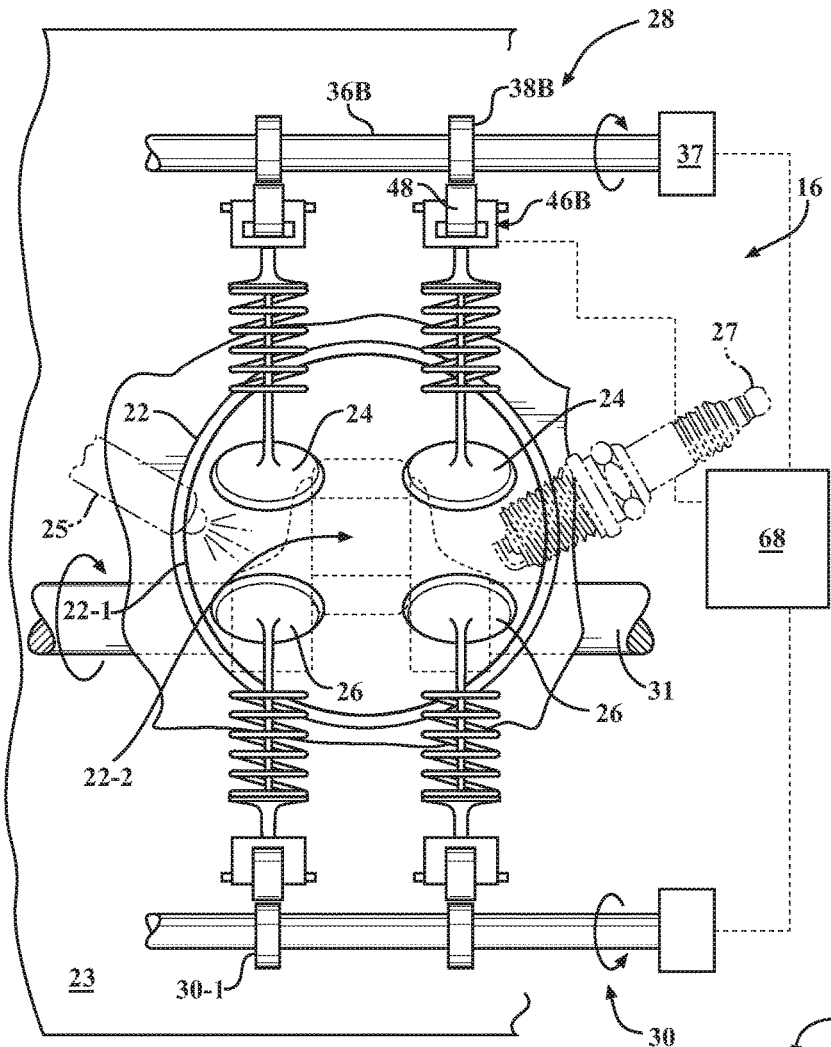
FIG. 5 is a schematic illustration of the engine having another embodiment of the mechanism configured to provide extended dwell at peak lift of the intake valves.
Figure 7:
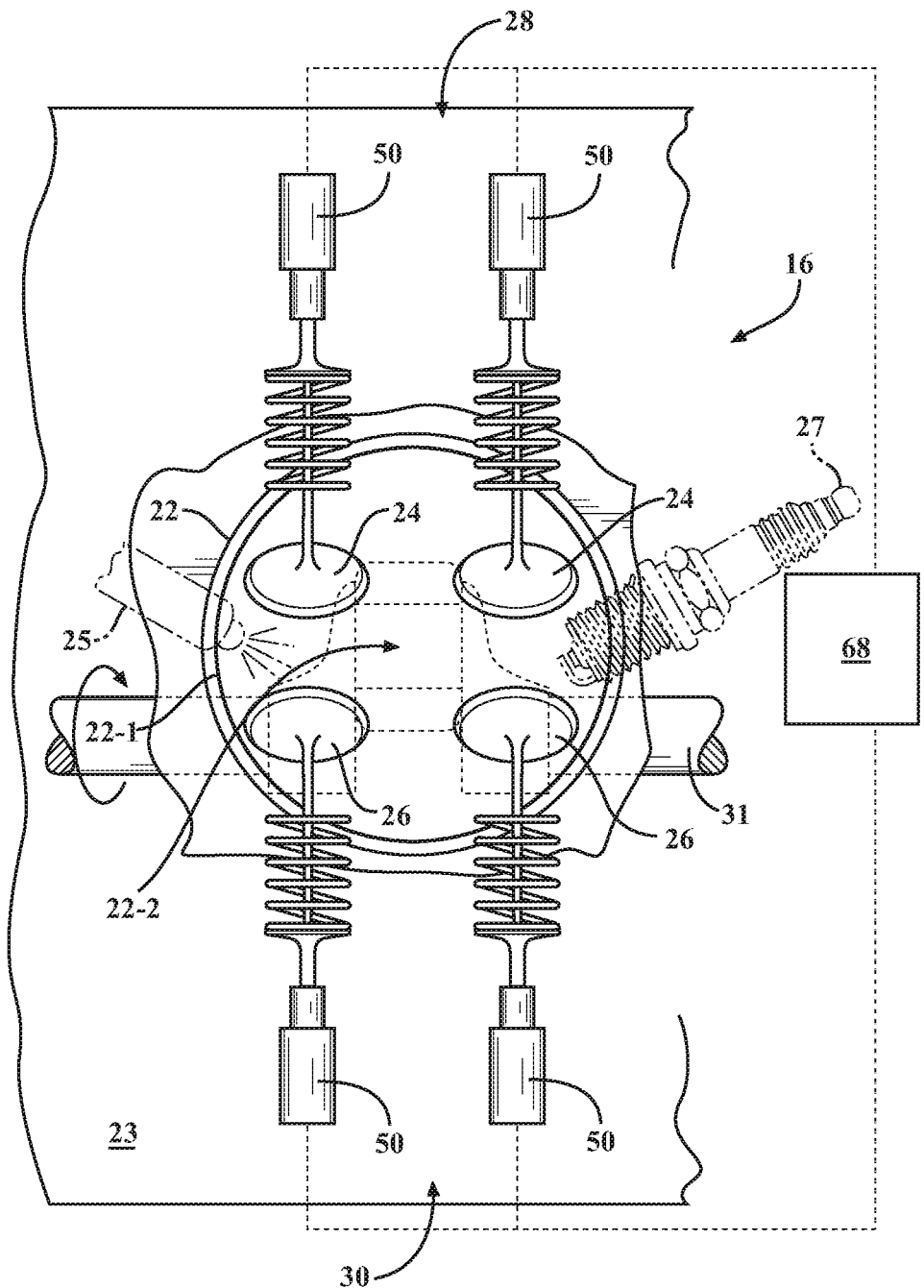
FIG. 7 is a schematic illustration of the engine having yet another embodiment of the mechanism configured to provide extended dwell at peak lift of the intake valves.

The cylinder head 23 receives air and fuel to be used inside the cylinders 22 for subsequent combustion. As can be seen in FIGS. 3, 5, and 7, each cylinder 22 includes a respective piston 22-1 configured to reciprocate therein. Additionally, combustion chambers 22-2 are formed within the cylinders 22 between the bottom surface of the cylinder head 23 and the tops of the pistons 22-1. As known by those skilled in the art, each of the combustion chambers 22-2 receives fuel and air that are combined to form a fuel-air mixture for subsequent combustion inside the subject combustion chamber. The engine 16 may include a throttle 19 (shown in FIGS. 1-2), which can be configured as a traditional movable throttle blade or another type of an arrangement that meters a volume of air entering the engine from the ambient. Although an in-line four-cylinder engine is shown in FIGS. 1 and 2, nothing precludes the present disclosure from being applied to an engine having a different number and/or arrangement of cylinders.

As shown in FIGS. 3, 5, and 7, the engine 16 also includes a plurality of intake valves 24 operatively connected to the cylinder head 23 and configured to control a supply of air to each cylinder 22 for combustion with fuel therein. The engine 16 may be configured as a spark-ignition internal combustion engine that employs fuel injectors 25 configured to deliver the necessary amount of fuel and spark plugs 27 to initiate combustion of the fuel and air mixture inside the combustion chambers 22-2. The engine 16 additionally includes a plurality of exhaust valves 26 operatively connected to the cylinder head 23 and configured to control removal of post-combustion gasses from each cylinder 22. A first mechanism 28 is configured to regulate opening and closing of the respective intake valves 24 during operation of the engine 16 and is particularly provided to generate a generally constant peak lift of the intake valves 24 for an extended period of time. Specific embodiments and operation of the first mechanism 28 will be discussed in greater detail below. A second mechanism 30 is configured to regulate opening and closing of the respective exhaust valves 26 during operation of the engine 16. The second mechanism 30 may be configured as an exhaust camshaft having a plurality of cam lobes 30-1 for actuating exhaust valves 26, or include other configurations that are similar to those described below with respect to the first mechanism 28.

The engine 16 also includes a crankshaft 31 configured to rotate within the cylinder block 20. As known to those skilled in the art, the crankshaft 31 is rotated by the pistons 22-1 via respective connecting rods (not shown) as a result of an appropriately proportioned fuel-air mixture being selectively admitted into the combustion chambers 22-2 via one or more intake valves 24 and burned in the combustion chambers. After the air-fuel mixture is burned inside a specific combustion chamber 22-2, the reciprocating motion of a particular piston serves to supplement the removal of post-combustion gasses 32 from the respective cylinder 22 via one or more exhaust valves 26. The cylinder head 23 is also configured to exhaust post-combustion gasses 32 from the combustion chambers 22-2, such as via an exhaust manifold 34. As shown in FIGS. 1-2, such an exhaust manifold 34 may be configured as a separate, attachable component for scavenging the exhaust post-combustion gasses 32 from the cylinders 22, or be internally cast, i.e., integrated, into the cylinder head 23 (not shown, but known to those skilled in the art).

With specific reference to FIGS. 3-8, the first mechanism 28 is configured to generate the constant peak lift of each intake valve 24, i.e., an extended dwell at peak lift of the respective intake valve, over an extended angle of rotation of the crankshaft 31. It is intended that the angle of rotation of the crankshaft 31 over which peak lift of each intake valve 24 remains constant would be at least 5 degrees, thus generating an opening at each intake valve having an increased duration versus that of a typical intake valve. Specifically, the first mechanism 28 may generate the constant peak lift of the intake valves 24 in the range of 5-80 degrees of the angle of rotation of the crankshaft 31. Such an extended dwell at peak lift of the intake valve generates an increased period of time that the supply of combustion air may be delivered to each cylinder 22. An embodiment of the first mechanism 28 shown in FIG. 3 may include an intake camshaft 36A having a plurality of cam lobes 38A, wherein each lobe is configured to actuate a respective intake valve 24. The cam lobes 38A include a lobe profile 40A that generates a constant peak lift of each intake valve 24 over the desired extended angle of rotation of the crankshaft 31. As shown in FIG. 3, the subject embodiment of the first mechanism 28 may include a plurality or set of cam followers 46A that transfer motion from the cam lobe 38A to the respective intake valve 24. Each cam follower 46A may be configured as a fixed-ratio rocker arm.

Figure 4:
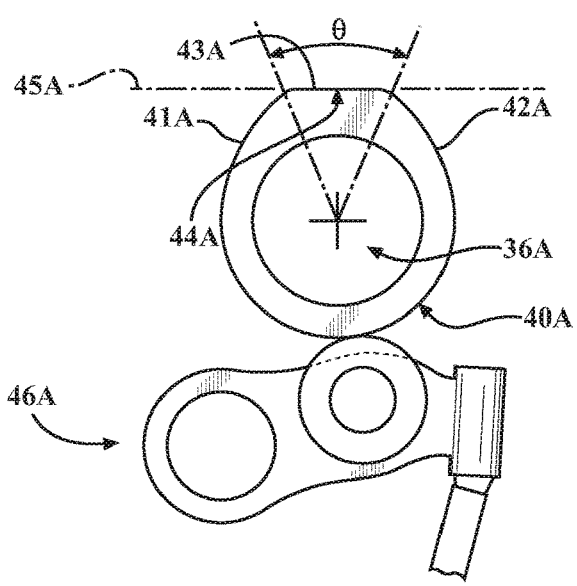
FIG. 4 is a schematic cross-sectional illustration of an intake camshaft lobe used by the embodiment of the mechanism shown in FIG. 3.

As can be seen from FIG. 4, the lobe profile 40A includes ramps 41A and 42A, and a generally flat portion 43A that defines a peak 44A of the cam lobe 38A. The flat portion 43A provides the extended dwell at peak lift of the respective intake valve 24 in comparison to a commonly used, relatively sharp or radiused peak that generates insignificant dwell at peak lift of an intake valve. The lobe profile 40A is characterized by a tangent 45A that remains substantially constant over the duration of the flat portion 43A. The flat portion 43A is intended to extend for a camshaft rotation angle θ that is more than 2.5 degrees of rotation of the camshaft 36A, which corresponds to greater than 5 degrees of crankshaft 31 rotation. As shown in FIG. 4, the flat portion 43A extends over 20 degrees of the angle θ of rotation of the intake camshaft 36A, which corresponds to 40 degrees of crankshaft 31 rotation.

Figure 6:
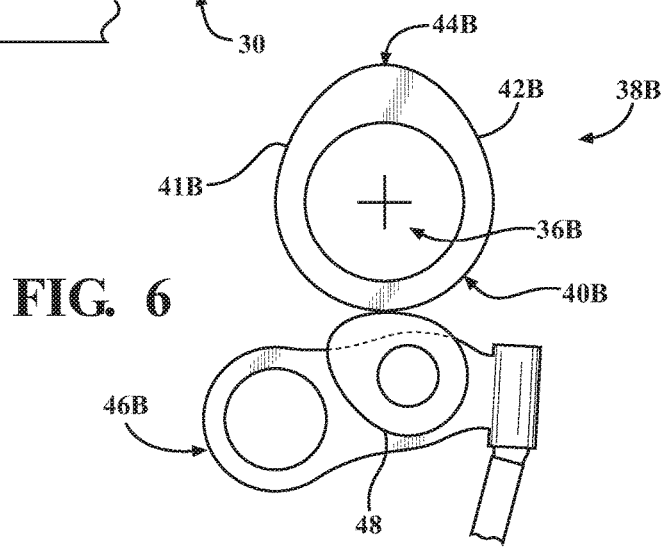
FIG. 6 is a schematic cross-sectional illustration of an intake camshaft lobe used by the embodiment of the mechanism shown in FIG. 5.

Another embodiment of the first mechanism 28 shown in FIG. 5 may include a camshaft 36B having a plurality of cam lobes 38B. Each lobe 38B includes a lobe profile 40B having ramps 41B and 42B, and provides a commonly known, relatively sharp or tightly radiused peak 44B, as shown in FIG. 6, that generates substantially zero or insignificant dwell at peak lift of the respective intake valve 24. In combination with the camshaft 36B, the subject embodiment of the first mechanism 28 includes a plurality or set of cam followers 46B that transfer motion from the cam lobe 38B to the respective intake valve 24. Each cam follower 46B is configured as a variable-ratio rocker arm that includes a rotatable cam-shaped roller 48 to generate the desired extended dwell at peak lift of the respective intake valve 24. To accomplish the desired extended dwell at peak lift of the intake valve 24 in the embodiment of FIGS. 5-6, the rotatable cam-shaped roller 48 may be arranged between each cam lobe 38B and each cam follower 46B, as shown, such that the rotation of the cam-shaped roller 48 varies an effective ratio of the cam follower. Appropriate rotation of the cam-shaped roller 48 may, for example, be effected by oil pressure generated by a fluid pump (not shown) mounted to the engine 16. In each of the embodiments of FIGS. 3 and 5, the first mechanism 28 may additionally include a camshaft phaser 37 configured to change position of the respective camshaft 36A, 36B with respect to position of crankshaft 31 during operation of the engine 16.

Figure 8:
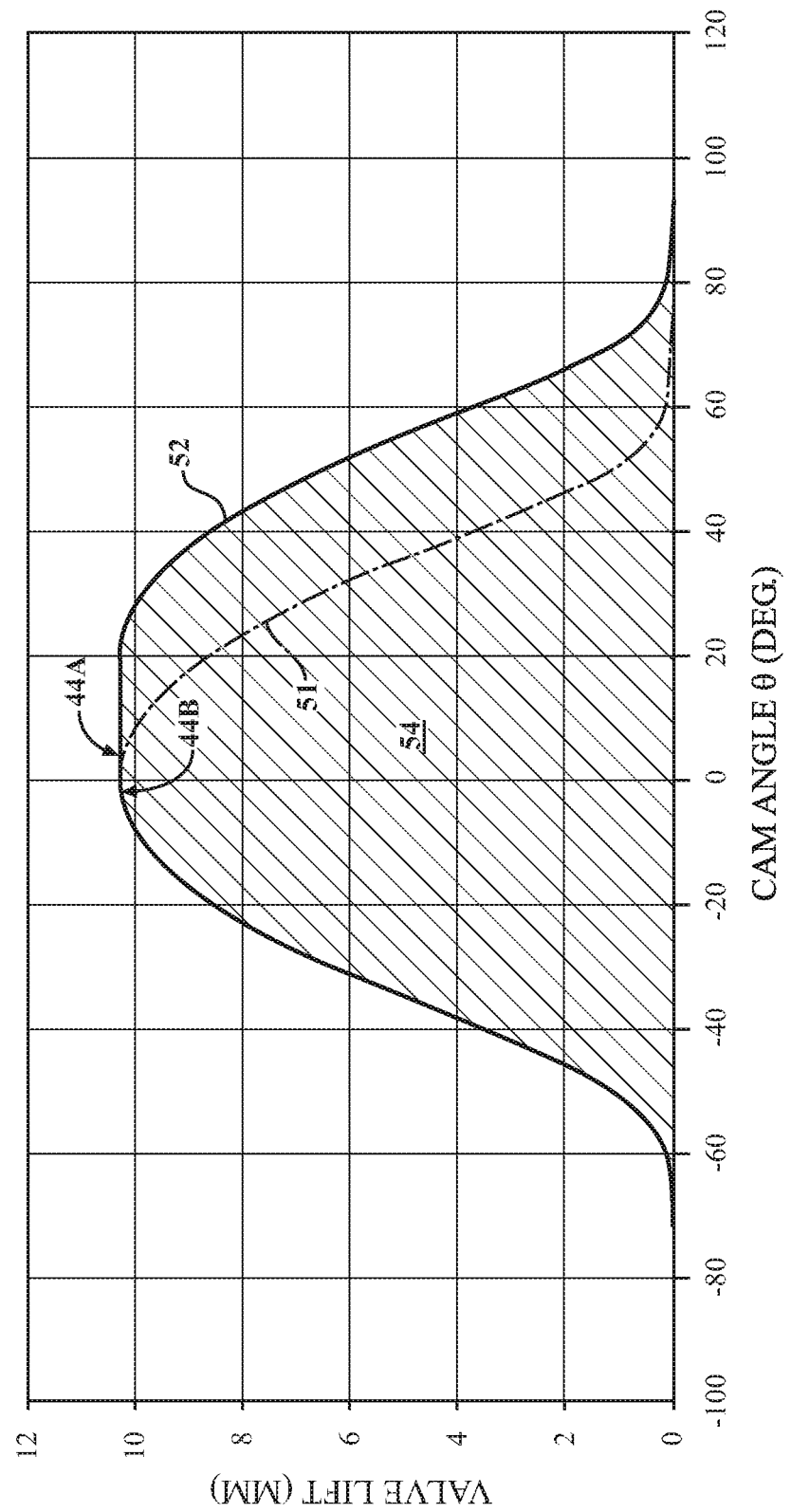
FIG. 8 illustrates an exemplary lift curve of an intake valve generated by the mechanism shown in FIGS. 3-7.

Alternatively, according to yet another embodiment shown in FIG. 7, the first mechanism 28 may include individual electro-hydraulic or electro-mechanical actuators 50. Each actuator 50 is configured to generate the desired constant peak lift of the respective intake valve 24 over the extended angle of rotation of the crankshaft 31. Such actuators 50 can be employed in place of the previously described camshaft 36A or camshaft 36B with cam followers 46B. An exemplary lift curve 52 that can be generated for intake valves 24 by the first mechanism 28 of each of the embodiments described above with respect to the respective FIGS. 3, 5, and 7 is shown in FIG. 8. The lift curve 52 illustrates a 20 degree angle θ of intake camshaft angle of rotation, which is equivalent to a 40 degree angle of rotation of the crankshaft 31 over which a peak lift of 10.3 mm for each intake valve 24 remains constant. In the illustrated embodiment of FIG. 8, the peak lift provided by the first mechanism 28 has been extended for an additional 20 degrees of cam angle θ as compared to the typical cam lobe profile 40B. Such an extended dwell at peak lift of the intake valve generates an increased area 54 under the lift curve 52, as compared with the area under a curve 51 generated by the typical cam lobe profile 40B, which corresponds to the increased period of time that the supply of combustion air may be delivered to the specific cylinder 22.

As shown in FIGS. 1 and 2, the engine 16 also includes a multi-stage boosting system 56 configured as a forced induction arrangement having a first gas compressor and a second gas compressor for pressurizing an airflow 58 that is received from the ambient for delivery to the cylinders 22. The first gas compressor may be configured as a low-flow or high-pressure turbocharger 60 and the second gas compressor may be configured as a high-flow or low-pressure turbocharger 62. Each of the low-flow and high-flow turbochargers 60, 62 is in fluid communication with the exhaust manifold 34 and configured to be driven by the post-combustion gasses 32 therefrom. The low-flow turbocharger 60 may be driven by the post-combustion gasses 32 directly from a first outlet 34-1, while the high-flow turbocharger 62 may be selectively driven by the post-combustion gasses from a second outlet 34-2 of the exhaust manifold 34 and/or from the turbine outlet of the high-pressure turbocharger 60. Such a multi-stage boosting system 56 may employ an exhaust flow shutter valve 56-1 for selectively directing the post-combustion gasses 32 and a compressor bypass valve 56-2 to selectively route the airflow 58 to each of the low-flow turbocharger 60 and the high-flow turbocharger 62. Additionally, the low-pressure turbocharger 62 may employ a wastegate 56-3 to control boost pressure generated by the multi-stage boosting system 56.

The low-flow turbocharger 60 pressurizes and discharges the airflow 58 to the cylinders 22 at comparatively lower flow rates of the post-combustion gasses 32, which are typically generated at lower rotational speeds, such as below approximately 3,000 RPM, of the engine 16. The high-flow turbocharger 62 pressurizes and discharges the airflow 58 to the cylinders 22 at comparatively higher flow rates of the post-combustion gasses 32, which are typically generated at intermediate and higher rotational speeds, such as around 3,000 RPM and above, of the engine 16. Accordingly, in the above example of the engine 16, the flow rates of the post-combustion gasses 32 generated below approximately 3,000 RPM are lower relative to the flow rates generated at and above the 3,000 RPM threshold. To support such distinct engine speed ranges and rates of airflow 58, the low-flow turbocharger 60 is typically sized comparatively smaller and thus has a smaller rotating inertia than the high-flow turbocharger 62.

Generally, in a multi-stage forced induction arrangement the output pressure from multiple compressors is greater than can be provided by a single compressor. Such a multi-stage forced induction arrangement may be configured to operate as a sequential system, wherein at least in some, typically intermediate, engine speed ranges both low- and high-pressure compressors operate simultaneously, i.e., with operational overlap. A multi-stage forced induction arrangement may also be configured to generate boost pressure as a staged system, where the low- and high-pressure compressors generate boost pressure in sequence, without any operational overlap.

As shown in FIG. 2, the multi-stage boosting system 56 may also be configured as a forced induction arrangement where the first gas compressor is configured as a supercharger 64, while the second gas compressor may be configured as the high-flow turbocharger 62. The supercharger 64 may be driven either mechanically by the crankshaft 31 via a belt 66 or electrically by an electric motor (not shown but known to those skilled in the art) operatively connected to the engine 16. In the embodiment shown in FIG. 2, at low gas flow rates, the airflow 58 may be initially passed through the high-flow turbocharger 62 and on to the supercharger 64. In a separate embodiment (not shown), at low gas flow rates, the airflow 58 may be received directly from the ambient and compressed by the supercharger 64 prior to being passed to the high-flow turbocharger 62. In either of the above-noted embodiments, the supercharger 64 will operate as a low-flow gas compressor, while the turbocharger 62 will operate as a high-flow gas compressor.

The engine 16 additionally includes an induction system that may include an air filter (not shown) upstream of the multi-stage boosting system 56 to channel the airflow 58 from the ambient to respective gas compressors. The induction system may additionally include at least one charge-air cooler 67 downstream of the multi-stage boosting system 56 for enhancing the engine's volumetric efficiency via increasing intake air charge density through nearly isobaric cooling. In separate embodiments, each of the turbochargers 60, 62 and the supercharger 64 are also fluidly connected to an intake manifold 69 that is configured to distribute the pressurized airflow 58 to each of the cylinders 22 for mixing with an appropriate amount of fuel and subsequent combustion of the resultant fuel-air mixture. In the case of the multi-stage boosting system 56 including the supercharger 64 and one of the turbochargers 60, 62, each of the supercharger and turbocharger can be provided with a respective charge-air cooler 67 for enhancing the engine's volumetric efficiency, as noted above.

As may be seen in FIGS. 1-2, the vehicle 10 may additionally include a programmable controller 68 configured to regulate operation of the engine 16, such as by controlling an amount of fuel being injected into the cylinders 22 for mixing and subsequent combustion with the pressurized airflow 58. The controller 68 may be a dedicated controller for the engine 16, a controller for the powertrain 12, or a central processing unit for the entire vehicle 10. The controller 68 may additionally be configured to regulate the embodiments of the first mechanism 28 illustrated in FIGS. 3, 5, and 6 and a transition between operation of the first and second gas compressors in the multi-stage boosting system 56. The controller 68 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 68 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 68 may also include a floppy disk, a flexible disk, hard disk, magnetic tape, any other magnetic medium, a CD-ROM, DVD, any other optical medium, etc. The controller 68 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 68 or accessible thereby may be stored in the memory and automatically executed to provide the required functionality.

The first mechanism 28 enables late intake valve closing (LIVC), as typically used in Atkinson or Miller combustion cycles, to trap a reduced amount of air and a proportionately smaller amount of fuel in the combustion chambers 22-2. The first mechanism 28 uses the extended dwell at peak lift of the intake valve 24 to delay or extend closure of the intake valves 24 further into the compression cycle of the engine 16. Typically, high engine load at low RPM results in elevated pressure inside the combustion chambers 22-2 increasing the likelihood of knock or auto ignition due to uncontrolled combustion. Therefore, limiting pre-combustion pressures inside the combustion chambers 22-2 via the first mechanism 28 generally has the effect of lowering combustion pressures and reducing the likelihood of knock or other uncontrolled combustion. Such an effect can be particularly beneficial in a boosted engine, such as the engine 16. A typical geometric compression ratio in an engine that employs a cylinder-pressure boosting compressor, such as any of the gas compressors 60, 62, and 64 discussed above, is typically set in the range of 8.5-9.5:1 primarily to manage combustion pressures. In the engine 16, however, the set geometric compression ratio may be at least 10:1, and specifically in the 11-16:1 range as a result of the first mechanism 28 controlling combustion pressures during boosted operation.

The relatively high geometric compression ratio in the engine 16 is enabled by the pre-combustion pressures or effective compression ratio being limited by the late intake valve closing being extended further into the compression cycle of the engine 16, which is itself enabled by the constant peak lift of the intake valves 24. As a result of the late intake valve closing being extended further into the compression cycle by the first mechanism 28, the combustion pressures inside the combustion chambers 22-2, i.e., the effective compression ratio, can be effectively managed during certain engine operating modes. For example, the effective compression ratio can be managed at lower engine speeds and higher loads when the multi-stage boosting system 56 is generating significant boost pressure. Thus, the first mechanism 28 enables controlled combustion in combustion chambers 22-2 to be retained despite the relatively high geometric compression ratio of the engine 16. Of note, the reduced volume of air trapped within the combustion chambers 22-2 due to the LIVC operation of the intake valves 24 can be offset by controlled operation of the first gas compressor 60. On the other hand, in comparison with a typical boosted engine, the otherwise significantly increased geometric compression ratio in the 11-16:1 range can facilitate enhanced torque output from the engine 16. Such enhanced torque output from the engine 16 may be achieved in all operating modes, both at lower engine speeds and boost levels, as well as at higher engine speeds and increased boost levels generated by the previously discussed combinations of gas compressors 60, 62, and 64.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder block defining a cylinder;
   a cylinder head mounted to the cylinder block;
   a reciprocating piston arranged inside the cylinder and configured to compress an air and fuel mixture at a geometric compression ratio of at least 10:1;
   a crankshaft arranged in the cylinder block and rotated by an application of combustion force on the piston;
   an intake valve operatively connected to the cylinder head;
   an exhaust valve operatively connected to the cylinder head and configured to control removal of post-combustion gas from the cylinder;
   a mechanism configured to provide a constant peak lift of the intake valve over an angle of rotation of the crankshaft that is at least 5 degrees, wherein the mechanism includes an intake camshaft having a cam lobe for opening and closing of the intake valve relative to a position of the crankshaft, wherein the mechanism includes a variable-ratio cam follower arranged between the cam lobe and the intake valve and configured to generate the constant peak lift of the intake valve, and wherein the variable-ratio cam follower includes a rocker arm having a rotatable cam-shaped roller in contact with the cam lobe and configured to vary an effective ratio of the cam follower; and
   a multi-stage boosting system having a first gas compressor, a second gas compressor, and a controller configured to regulate operation of the first and second compressors to selectively pressurize air being received from the ambient for delivery to the cylinder.

2. The engine of claim 1, wherein the first gas compressor is configured as a low-flow turbocharger driven by the post-combustion gas and the second gas compressor is configured as a high-flow turbocharger driven by the post-combustion gas.

3. The engine of claim 1, wherein the first gas compressor is configured as a mechanically- or electrically-driven supercharger, and wherein the second gas compressor is configured as a high-flow turbocharger driven by the post-combustion gas.

4. The engine of claim 1, wherein the mechanism generates the constant peak lift of the intake valve in the range of 5-80 degrees of the angle of rotation of the crankshaft and delays closing of the intake valve into the compression cycle of the engine.

5. The engine of claim 1, wherein the engine is a spark-ignition internal combustion engine.

6. The engine of claim 5, wherein the geometric compression ratio of the engine is in a range of 11-16:1.

7. A vehicle comprising:
a road wheel; and
an internal combustion engine configured to generate torque for driving the road wheel, the engine having:
a cylinder block defining a cylinder;
a cylinder head mounted to the cylinder block;
a reciprocating piston arranged inside the cylinder and configured to compress an air and fuel mixture at a geometric compression ratio of at least 10:1;
a crankshaft arranged in the cylinder block and rotated by an application of combustion force on the piston;
an intake valve operatively connected to the cylinder head;
an exhaust valve operatively connected to the cylinder head and configured to control removal of post-combustion gas from the cylinder;
a mechanism configured to provide a constant peak lift of the intake valve over an angle of rotation of the crankshaft that is at least 5 degrees, wherein the mechanism includes an intake camshaft having a cam lobe for opening and closing of the intake valve relative to a position of the crankshaft, wherein the mechanism includes a variable-ratio cam follower arranged between the cam lobe and the intake valve and configured to generate the constant peak lift of the intake valve, and wherein the variable-ratio cam follower includes a rocker arm having a rotatable cam-shaped roller in contact with the cam lobe and configured to vary an effective ratio of the cam follower; and
a multi-stage boosting system having a first gas compressor, a second gas compressor, and a controller configured to regulate operation of the first and second compressors to selectively pressurize air being received from the ambient for delivery to the cylinder.

8. The vehicle of claim 7, wherein the first gas compressor is configured as a low-flow turbocharger driven by the post-combustion gas and the second gas compressor is configured as a high-flow turbocharger driven by the post-combustion gas.

9. The vehicle of claim 7, wherein the first gas compressor is configured as a mechanically- or electrically-driven supercharger, and wherein the second gas compressor is configured as a high-flow turbocharger driven by the post-combustion gas.

10. The vehicle of claim 7, wherein the mechanism generates the constant peak lift of the intake valve in the range of 5-80 degrees of the angle of rotation of the crankshaft and delays closing of the intake valve into the compression cycle of the engine.

11. The vehicle of claim 7, wherein the engine is a spark-ignition internal combustion engine.

12. The vehicle of claim 11, wherein the geometric compression ratio of the engine is in a range of 11-16:1.

* * * * *